United States Patent Office 3,022,267
Patented Feb. 20, 1962

3,022,267
STABILIZED ISOTACTIC POLYPROPYLENE
AND METHOD
David W. Young, Homewood, Ill., assignor to Sinclair Refining Company, New York, N.Y., a corporation of Maine
Filed May 14, 1958, Ser. No. 735,130
No Drawing. Filed May 14, 1958, Ser. No. 735,130
6 Claims. (Cl. 260—45.9)

This invention concerns a novel composition which comprises a major amount of isotactic polypropylene and a minor amount of a high molecular weight amide, in particular N-stearoyl p-amino phenol.

Isotactic polymers are head-tail-connected linear polymers, the monomer units of which ($CH_2=CHR$) are distinguished by a simple, regular structure incapable of stereoisomerism. Their chains consist of sections which exhibit a uniform reiteration of monomer units with tertiary C atoms of equal steric configuration. In isotactic polypropylene, the "R" group of the formula is a $CH_3$ group. The structure of this polymer is illustrated in 197, Scientific American, number 3, pages 102 and 103 (September 1957).

The advantages of isotactic polymers have been cited by Natta in 68, Angewandte Chemie, 393–403 (1956). These high-melting thermoplastic polymers, obtained from low-priced starting materials, yield fibers of great tensile strength, which are useful as textile raw materials. Isotactic polypropylene threads have a tear strength up to more than 7 g./den. (70 kg./sq. mm.), comparable to the strength of steel, but with a specific gravity of one-eighth as high as that of iron. Isotactic polypropylene surpasses polyethylene in many properties. This polypropylene has an average molecular weight generally of from about 100,000 to 1,500,000 Staudinger. The $CH_3$ groups are located on the same side of the carbon chain in a helical structure, characterized by an identity period generally of from about 6.5 to 6.6 A. along the axis of the principal chain. It has a high melting point (e.g. 346° F.) and is a solid, highly crystalline substance with, for instance, the following physical properties:

Specific gravity _____ 0.90–0.92.
Tensile strength ASTM D–638052T
  lbs./in.$^2$ _____ 4,600 to 5,400.
Stiffness (flexual) ASTM D–747–50
  lbs./in.$^2$ _____ 130,000 to 170,000.
Impact strength Izod test unnotched
  ½" x ½" bar ASTM D–256–54T
  ft. lb./in. _____ 19.
Fusion temperature, ° F. _____ 316.4 to 338.
Compressive strength ASTM D–695–
  54 lb./in.$^2$ _____ 9,500–11,000.
Dielectric constant ($10^6$ cycles/
  sec.) _____ 2.0–2.1.
Hardness Rockwell ASTM D–785–51
  R-scale _____ 85–95.
Melting point, ° F. _____ 330–350.
Specific heat-K cal./gm., ° C. ____ 0.46.

X-ray diffraction pattern of isotactic polypropylene in terms of Bragg spacings (d./n.) and intensities:

| d./n. | int. |
|---|---|
| 6.31 A. | 10 |
| 5.26 | 8 |
| 4.81 | 5 |
| 4.22 | 6 |
| 4.08 | 8 |
| 3.51 | 2 |
| 3.12 | 2 |
| 2.12 | 1 |

Natta, in 37, La Chimica and Industria (Milan), 888–900 (1955), attributes to the isotactic structure certain properties which had previously not been found in hydrocarbons. At ambient temperatures, these high-molecular-weight polymers are actually hard, crystalline solids. The low-molecular-weight isotactic polymers exhibit likewise a high degree of crystallinity. For example, isotactic polypropylene specimens with a molecular weight of about 2,500 present the same crystalline polymeric structure as those polymers which have weights of several hundreds of thousands. The isotactic polymers are of great resistivity towards isomerization effects, which would modify the configuration of the branched methyl group, even in the presence of catalysts which act by an ionic mechanism. Prolonged heating to 300–350° C. in the absence of catalysts (or else to lower temperatures, but in the presence of various reagents which act by a free-radical mechanism), may cause a depolymerization of the macro-molecules, although not to a very large extent.

There are noteworthy differences in the degrees of solubility between isotactic and non-isotactic polymers, which contain irregularly distributed carbonium atoms of diverse steric configurations, as shown in Table I.

TABLE I

| Polymer | Intrinsic viscos.[1] 100 cc./g. | Experim. spec. gravity | 1-order transition temp., °C. | Initial fusion temp. | Solubility in | | |
|---|---|---|---|---|---|---|---|
| | | | | | Ether | n-Heptane | Toluene |
| High-molecular-weight crystalline polypropylene.[2] | 2.40 | 0.92 | 158–160 | | Insol | Insol | Sol. |
| Low-molecular-weight crystalline polypropylene.[3] | 0.17 | 0.91 | 149 | | Insol | Sol | Sol. |
| Amorphous polypropylene.[4] | 0.55 | 0.85 | | 75 | Sol | Sol | Highly sol. |

[1] Determined at 135° C. using tetralin as a solvent.
[2] Isotactic.
[3] Made by depolymerizing the high-molecular-weight crystalline material at 335° C. in a tetralin solution and a nitrogen atmosphere.
[4] Atactic-made according to conventional procedures.

A product which is insoluble in boiling n-heptane is practically completely crystalline. An ether-extracted polypropylene product is completely amorphous and has a much lower transistion temperature. After sulfochlorination and vulcanization treatments, the amorphous type presents elastomer-like properties.

These isotactic polypropylenes can be prepared from propylene with Ziegler type catalysts including complexes consisting of several substances, for instance, the chloride of a metal with an unfilled electron shell, and an organo-metallic compound, under polymerization conditions including temperatures above ambient temperatures, e.g. from about 68° to 302° F. and pressures from about atmospheric or less up to about 30 atmospheres or more. With catalysts of high selectivity, very high yields of isotactic polymers may be obtained. The formation of amorphous, non-crystalline polymers may be almost completely prevented.

Natta has found that the production of isotactic polymerizates of alpha-olefins requires the presence of solid catalysts which are chemically bound to the growing polymer chain. It is probable that such stereospecific catalytic processes are based on the chemisorption of the monomer-molecules on the surface of the solid catalyst, and that the adsorbed molecule presents itself always in a definite orientation on the growing chain.

This type of catalyst is characterized by the presence of compounds of a metal of the fourth to the eighth group of the transition elements in a lower stage of oxidation. The structure of their atoms is characterized by the incompleteness of the $d$-shell. Their compounds, in a lower stage of oxidation, can enter into associations with metal hydrides or with metal alkyls, whereby complexes are formed in which metal-hydrogen or metal-alkyl linkages are found in a highly polarized form.

In practical operation, the best catalysts are obtained from Ti, V, Cr and Zr. The polymerization catalysts are produced by reacting compounds of these metals with alkyls or hydrides of Na, Li, Ba or Al. Compounds of a lower stage of oxidation, such as $VCl_2$ and $TiCl_2$, enter into combinations with the metal hydrides or metal alkyls. This results in the formation of catalysts which act by an anionic mechanism. These catalysts are heterogeneous, due to the presence of a solid phase, which may be colloidal in dimension or microcrystalline.

Typical catalysts with an anionic mechanism-activity are those which are obtained by treating, with metal alkyls, solid crystalline lower halides of metals of the preferred transition element group. The quantity of metal alkyl required for accomplishing maximum catalytic activity, is relatively small: e.g. 0.1 mol. $AlR_3$ per mol. of the halide of the transition element. Natta found it advantageous to operate with an excess of this metal alkyl compound, to exert a protective activity by destroying oxygen and moisture which may be present in trace amounts. Otherwise, these substances might poison the catalysts. Using the terminology developed for cationic catalysis, Natta hypothesizes that in this type of anionic catalysis the transition element compound may be regarded as the catalyst and the other compound, aluminum trialkyl or aluminum dialkylhydride, for instance, as the co-catalyst.

Natta also found (69, Angewandte Chemie, 213–219 [1957]) that the final reaction velocity after an initial adjustment period is a linear function of the amount of the crystalline constituents of the catalyst and remains constant for a long period of time, sometimes more than thirty hours, when the concentration of the catalyst is sufficiently low. The rate of reaction is also a linear function of the propylene partial pressure. The energy of activation of the over-all process lies at approximately 12,000–14,000 kcal./kmol., a value which is lower than that found in most of the radical-activated polymerization processes. The number of active centers created by the interaction between aluminum triethyl and titanium trichloride surfaces does not vary markedly with time, if the catalyst has attained the final state.

As has been pointed out above, isotactic polypropylene made according to the process outlined by Natta has valuable properties for use as a synthetic film or fiber. However, it has been found that exposure of this material to light and air causes a darkening of such film and fiber products which seriously affects their marketability. Since these polymers are essentially paraffinic in nature, and since the linearity of them is due to the absence of any active centers along the polymer chain, it is hypothesized that the polymer molecule is attacked at its end, since Natta theorizes that a vinylidene group appears at the end of the molecule when it breaks away from the "growing surface" of the catalyst. This invention, however, is not to be limited by this theory.

This invention consists in mixing with the isotactic polypropylene 0.005 percent to 5 percent of a high molecular weight amide which is soluble in the polymer, that is, N-stearoyl p-amino phenol to produce an oxygen-stabilized product.

N-stearoyl p-amino phenol is sold under the trade name "Suconox-18." It is a white solid which melts at 131–134° C. (268–273° F.) and can be heated to above 250° C. (482° F.) without any detectable evidence of decomposition, and appears to be non-toxic. In "Suconox-18" the "stearoyl" group is a mixture derived from commercial stearic acid and is, theoretically, primarily $C_{17}H_{35}CO$-.

N-stearoyl p-amino phenol is prepared in general by reacting an approximately equimolar amount of stearic anhydride or dry stearic acid with the amino-phenol in the presence of a solvent or water-entraining agent such as benzene, toluene or xylene. The solid product is then dehydrated by evaporation and the product is obtained in relatively pure form.

The N-stearoyl p-amino phenol can be used in isotactic polypropylene over the concentration range of 0.005 percent to 5 percent. However, best results are obtained at about 0.01 to 0.25 percent by weight. It is important to obtain adequate dispersion of the N-stearoyl p-amino phenol in the polypropylene and this can be done by mixing the N-stearoyl p-amino phenol with the polymer isotactic polypropylene at a temperature about 5 to 10° F. above the crystalline melting point of the polymer and holding this temperature for about 2 to 5 minutes, then removing the heat and letting the temperature drop to cool the mixture at the rate of about 15 to 30° F. in about 7 to 10 minutes. The polymer and anti-oxidant are agitated together as the system is cooled and the mixture reverts from a liquid to a solid.

When the isotactic polypropylene with 0.1 percent N-stearoyl p-amino phenol is placed in a watch glass and held for 15 days in a circulating air oven in the dark at 150° F. the product shows no change in color. An isotactic control with no anti-oxidant present gave a product in the same type test at the same time that was dark brown in color. The results are recorded in Table II.

TABLE II

*Isotactic polypropylene*

| Property | Original | Original after 15 days at 150° F. | Original plus 0.1% N-stearoyl p-amino phenol after 15 days at 150° F. |
| --- | --- | --- | --- |
| M.Pt., ° F | 330 | 384 | 332 |
| Mol. weight | 150,000 | 47,000 | 144,000 |

Isotactic polypropylene has found uses as an additive in wax, white oil, soap and other compositions. This invention provides a means whereby the isotactic polypropylene may be stabilized when admixed with other materials as well as when it is used as the major constituent of fiber, film or other materials, along with suitable amounts of other additives such as plasticizers, etc.

Although N-acyl p-amino phenols have been suggested in U.S. Patent No. 2,654,722, as a suitable stabilizer for various conventional polymers and elastomers of the more or less highly cross-linked type, these materials are apparently attacked by oxygen in a different manner from the attack by oxygen on isotactic polypropylene, since few materials which will stabilize cross-linked polymers have any stabilizing effect on isotactic polypropylene, and since N-stearoyl p-amino phenol has a better stabilizing effect on isotactic polypropylene than on non-isotactic polypropylene.

I claim:

1. A composition of matter consisting essentially of solid, crystalline isotactic polypropylene and 0.005 to 5 percent of N-stearoyl p-amino phenol.

2. The composition of claim 1 which contains 0.01 to 0.25 percent of N-stearoyl p-amino phenol.

3. The composition of claim 2 resulting from mixing the ingredients at about 5 to 10° F. above the melting point of the polymer.

4. A method of stabilizing a solid, crystalline isotactic polypropylene composition which comprises mixing the polypropylene and 0.005 to 5 percent by weight of N-stearoyl p-amino phenol at a temperature about 5 to 10° F. above the crystalline melting point of the polypropylene and holding the mixture at this temperature for about 2 to 5 minutes.

5. The composition of claim 1 in which the isotactic polyropylene has an average molecular weight of from about 100,000 to 1,500,000 Staudinger.

6. The method of claim 4 which includes cooling the mixture at the rate of about 15 to 30° F. in about 7 to 10 minutes, after the holding step.

References Cited in the file of this patent

UNITED STATES PATENTS

| | | |
|---|---|---|
| 2,654,722 | Young et al. | Oct. 6, 1953 |
| 2,705,227 | Stamatoff | Mar. 29, 1955 |
| 2,824,089 | Peters et al. | Feb. 18, 1958 |
| 2,843,577 | Friedlander et al. | July 15, 1958 |
| 2,908,670 | Hagemeyer et al. | Oct. 13, 1959 |
| 2,921,048 | Bell et al. | Jan. 12, 1960 |
| 2,925,400 | Tholstrup et al. | Feb. 16, 1960 |
| 2,939,860 | Schramm | June 7, 1960 |
| 2,957,849 | Kennedy | Oct. 25, 1960 |